Oct. 25, 1949.     K. L. MILLS, JR     2,485,906
CATALYTIC HYDROCARBON CONVERSION
Filed Jan. 2, 1948
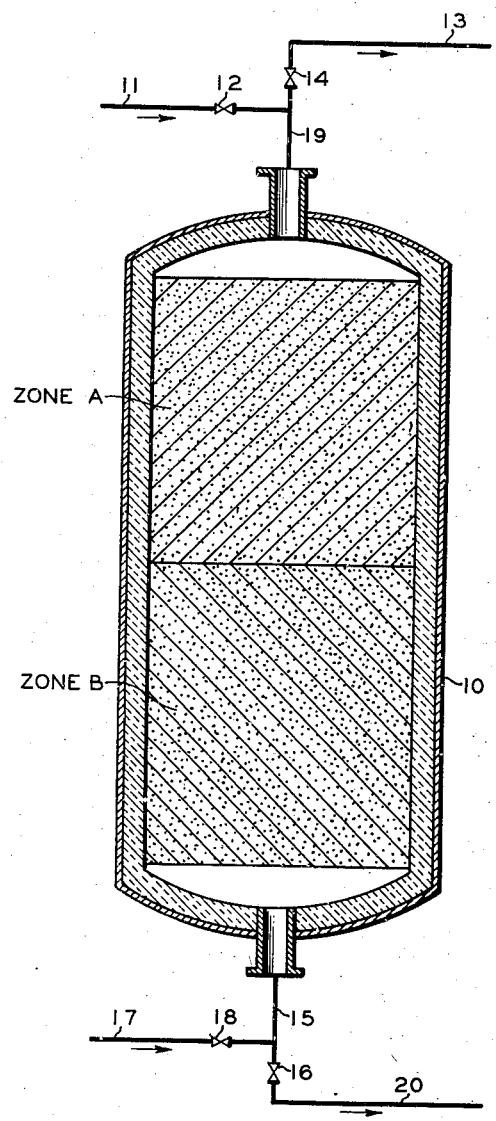
INVENTOR.
K. L. MILLS JR.
BY *Hudson & Young*
ATTORNEYS Patented Oct. 25, 1949

2,485,906

UNITED STATES PATENT OFFICE 2,485,906

CATALYTIC HYDROCARBON CONVERSION

King Louis Mills, Jr., Bartlesville, Okla., assignor to Phillips Petroleum Company, a corporation of Delaware Application January 2, 1948, Serial No. 135

7 Claims. (Cl. 196—52)

This invention relates to a process for hydrocarbon conversion. In one of its more specific aspects it relates to an improved process for catalytic hydrocarbon conversion. In a specific embodiment, this invention relates to a continuous conversion process wherein the activity of the individual units of the catalyst is periodically restored by reactivation in situ.

Catalysts are used in many branches of the petroleum industry to aid in effecting a great and varied number of reactions. In general, they fall within two classes; natural and synthetic. Within these classes the catalysts may be found in many shapes. These range from crushed particles to rods, spheroids, beads, powders, and liquids. The use of any particular solid type catalyst will depend a great deal upon its activity index, and its reactivation characteristics when such regeneration is necessary.

The term "activity index" of a catalyst as referred to herein, is used to indicate the proportion of a particular material converted by the catalyst in relation to the proportion of material converted by some other catalyst used as a standard. It is a means for comparing the amount of conversion obtained by two or more catalysts when used to treat the same material under the same conditions. For example: a particular Arkansas bauxite may be used as a standard and given an activity index of 100. Another catalyst which gives the same proportion of material converted under the same conditions would also be given an activity index of 100, using the Arkansas bauxite as a reference. A catalyst which gives less conversion under the same conditions would be rated below 100, and one which gives higher conversion would be rated above 100.

Many catalysts, such as the solid type cracking catalysts, must be reactivated, primarily to remove the deposits of carbonaceous materials therefrom. In many cracking processes a certain amount of the charge material is broken down in such a manner that a material of high carbon content is deposited on the catalyst particles. It is said that a catalyst, from which such carbonaceous deposits are removed with a minimum of time and reactivation gas, has good reactivation characteristics. It has often been found that a catalyst which has a very high activity index has very poor reactivation characteristics. Conversely, there are catalysts which have very good reactivation characteristics but rather low activity indices.

It is quite obvious that an ideal catalyst is one having both a high activity index and superior regeneration characteristics. The development of catalysts with these properties is the goal of those connected with the manufacture and production of catalysts.

Synthetic catalysts as referred to herein are those defined in the following discussion. In this group are the synthetic silica gel type cracking catalysts which may contain minor portions of alumina or other metal oxides such as those of zirconia and of the metals in groups 3B and 4A of the periodic system. These metal oxides may be added to the silica in several ways. For instance they may be added by coprecipitation, or a wet hydrous silica gel may be combined with a wet hydrous metal oxide gel and then pelleted. A further method of preparation is by treating a hydrous acidic silica gel with an aqueous solution of a hydrolizable salt of the metal, whereby the salt of the metal is adsorbed on the silica gel by hydrolytic action. The resulting material is washed and dried in a known manner. A further example of a synthetic catalyst as referred to herein, and its method of production, is the following: silica-alumina gel may be prepared by passing a mixture of sodium silicate and acid which forms a clear hydrosol capable of setting to a hydrogel without substantial change in chemical composition, into a mineral oil. The hydrosol forms spheroidal particles of hydrogel which are washed and dried. Such catalyst pellets or beads may be produced in various sizes; however, when the pellets are of a size ranging from 8 to 10 millimeters in diameter and above, considerable cracking and splitting of the pellets takes place unless properly treated. Alumina may be added by methods previously discussed or by other methods known in the art.

Such synthetic catalysts have been used extensively in moving bed types of catalytic cracking processes, and have given superior results. In this type of process fresh catalyst is continuously introduced to the catalyst chamber, and spent catalyst is continuously removed for reactivation. By this means, the activity of the catalyst is maintained within the desired range, and no time is lost in reactivation. However, the picture is a great deal different when such synthetic catalysts are used in fixed bed catalytic cracking processes. Immediately, difficulties are encountered because of the length of time required for regeneration. The time required for reactivation of a catalyst used in such a process is of major importance, particularly economically. The more time required for reactivation, the less time may be used for cracking.

Synthetic catalysts, of the type used in this invention and as referred to above, are generally more dense in structure than natural bauxite and natural clay catalysts. This characteristic is one of the factors which makes such catalysts more difficult to regenerate. A portion of the carbonaceous material which deposits on a catalyst during a process cycle is embedded in the pores of the catalyst. To reactivate the catalyst, the carbonaceous deposit must be removed, usually by combustion. To do this a stream of oxygen or oxygen-containing gas is passed over the catalyst at a sufficient temperature to ignite the carbon. The deposit on the outside of the catalyst is readily removed; however, additional time is required to remove that which is embedded in the pores of the catalyst. It is this latter step which prolongs the reactivation time of synthetic gel catalysts.

Natural catalysts referred to herein are of the natural clay type cracking catalysts, such as bauxite and montmorillonite. These natural catalysts are usually less active than synthetic catalysts; however, their reactivation characteristics are more desirable. This is due in part to the larger pores of the natural catalyst which enables carbonaceous materials to be burned out easily during regeneration.

An object of this invention is to provide a simple process for catalytic conversion of hydrocarbons. Another object is to provide a method for decreasing the reactivation time of a synthetic catalyst. Another object is to increase the activity index of a natural catalyst. Another object is to provide a method for utilizing a synthetic catalyst and a natural catalyst in a fixed bed catalytic cracking process. Another object is to maintain the high activity characteristics of a synthetic catalyst throughout a catalyst chamber containing in one zone a natural catalyst of good reactivation characteristics and in a second zone a synthetic catalyst. Another object is to provide a method for using a synthetic spheroidal silica-alumina catalyst and a natural bauxite catalyst in a fixed bed catalytic cracking process. A further object is to decrease the reactivation time of a synthetic spheroidal silica-alumina catalyst. Further objects and advantages of this invention will be apparent, to one skilled in the art, from the accompanying disclosure and discussion.

I have discovered that in a fixed-bed catalytic cracking process, by utilizing a synthetic spheroidal silica-alumina or other similar synthetic catalyst in combination with a natural bauxite or other natural cracking catalyst of good reactivation characteristics, and by passing a suitable charge stock through the catalyst, first contacting the natural catalyst and then the synthetic catalyst, the higher activity of the synthetic catalyst may be utilized to its fullest. Further, I have discovered that when reactivating a composite catalyst bed containing these two types of catalysts, the difficulties of reactivating the synthetic catalyst may be overcome.

In the practice of one preferred embodiment of this invention in an improved catalytic cracking process, a material such as gas oil, topped crude, or reduced crude is heated to reaction temperature and passed in the vapor phase through a catalyst chamber, containing in a first zone a fixed bed of natural catalyst, such as bauxite or montmorillonite, and in a second zone a synthetic catalyst, such as spheroidal silica-alumina. The hot oil vapors contact first the less active natural catalyst in the first zone at the optimum temperature for obtaining the highest conversion rate; and second, the more active synthetic catalyst, after the temperature has been reduced due to the endothermic reaction over the natural catalyst, in the second catalyst zone. In the second catalyst zone containing the synthetic catalyst the charged material is further cracked, and the cracked products from the natural catalyst zone are reformed, thus giving a product of superior quality. When it becomes necessary to reactivate the catalysts, the catalyst zones are first flushed with steam and/or oxygen-free flue gas to purge same of all hydrocarbon materials, other than the carbonaceous deposit on the catalysts. After purging the catalysts of hydrocarbons, oxygen-containing reactivation gas is passed thru the catalyst chamber in a direction such that it contacts the synthetic catalyst first and the natural catalyst second i. e., in a direction opposite to that of the hydrocarbon feed. In this manner, the reactivation gas may contact the synthetic catalyst, of somewhat inferior reactivation characteristics, at an optimum temperature. The natural catalyst, of good reactivation characteristics, utilizes oxygen remaining in the reactivation gas stream which has not taken part in the combustion of the carbonaceous materials in the synthetic catalyst zone. When a catalyst is ready for reactivation, it does not necessarily mean that it is completely inactive. It usually means that the rate of conversion of the charge stock has been reduced to an uneconomical point by the carbonaceous deposits on the catalyst.

In the process of reactivation of the catalysts, a reactivation gas stream initially containing 4 to 8 volume per cent oxygen is passed through the catalyst beds, contacting first the synthetic catalyst and then the natural catalyst. When the outer carbonaceous deposit has been burned off, the oxygen content of the regeneration gas is reduced to about 3 to 3.5 per cent. By controlling the volume of oxygen in the reactivation gas, the volume of oxygen not used up by the reactivation of the synthetic catalyst is maintained at about 2 to 2.5 per cent which is the amount necessary for reactivating the natural catalyst. A suitable space velocity for the reactivation gas through the catalyst chamber is 500 to 2000 volumes of gas per volume of total catalyst per hour. The temperature within the catalyst chamber during reactivation should not go above 1100° F. in the synthetic catalyst zone, and not above 1400° F. in the natural catalyst zone. This may be effected by further regulating the oxygen content and the space velocity of the reactivation gas as is known to those skilled in the cracking art, and by the addition of steam with the reactivation gas.

A process-regeneration cycle as used herein is a complete cycle of operation which includes the cracking of a charge stock and the reactivation of the cracking catalysts. A process period is that portion of a process cycle in which hydrocarbons are cracked within the catalyst chamber.

In the following description one method of operating my process is specifically disclosed. It is understood, however, while this is representative in general of my process, various minor changes may be made in adapting the process to the various conditions, within the scope of the invention.

A more detailed understanding of some of the many aspects of my invention may be had by referring to the attached drawing which is a schematic flow diagram.

A charge stock, such as virgin gas oil is heated to a temperature in the range of 850 to 1100° F., and at a pressure of 10 to 200 pounds per square inch is introduced to catalyst chamber 10 through line 11, valve 12, and line 19, contacting a natural catalyst in zone A. From zone A the charge stock passes to zone B which contains a synthetic catalyst, and which comprises 25 to 50 volume per cent of the total catalyst zone. From catalyst chamber 10, effluent is removed through line 15, valve 16 and line 20 to suitable separation equipment. While the above described catalytic cracking phase of a cycle is taking place, valves 14 in line 13, and 18 in line 17, are closed. To reactivate the catalysts, valves 12 and 16 are closed, and valves 14 and 18 are opened. Reactivation gas is introduced to catalyst chamber 10 through line 17, valve 18, and line 15, at a temperature in the range of 800 to 1000° F. It contacts first the synthetic catalyst in zone B at its optimum reactivation temperature, and then contacts the natural catalyst in zone A, where the remaining oxygen is consumed in burning the carbonaceous deposit from the natural catalyst. Effluent reactivation materials are removed from catalyst chamber 10 through lines 19 and 13, and valve 14. During the reactivation period, the temperature in the synthetic catalyst zone should not be allowed to go above 1100° F., and that in the natural catalyst zone, though it may be allowed to rise to a higher temperature, should not be allowed to go above 1400° F. Suitable temperature recording and control equipment is installed in conjunction with the catalyst chamber so that the reactivation-temperatures do not become excessive. It is within the scope of this invention to use more than one catalyst chamber, in such a manner that one chamber may be on a cracking portion of a process cycle while another chamber is on a reactivation portion of a process cycle.

As a result of the above-described process and as is shown by the data in the following example, a synthetic catalyst, such as spheroidal silica-alumina may be effectively used in a fixed bed catalytic cracking process. In doing this and by following the teachings of this invention the reactivation time for the synthetic catalyst may be economically decreased to that of the natural catalyst, while the high activity of the synthetic catalyst is maintained. This is possible because a larger through-put of reactivation gas may be used without wastage, whereas if only a synthetic catalyst was used a smaller volume of reactivation gas could be used without excessive wastage. In this manner the larger volume of oxygen reactivates the synthetic catalyst more quickly, and that which is not used by the synthetic catalyst is readily utilized by the natural catalyst of good reactivation characteristics. In addition, the improvement in the products is possible because the charge stock is passed thru the natural catalyst at its optimum activity temperature, producing a maximum of conversion, and then thru the synthetic catalyst of high activity index at a lower temperature and obtaining further high conversion.

Some of the advantages of this invention are illustrated by the following specific example. The reactants and their proportions, and other specific ingredients and conditions, are presented as being typical and should not be construed to limit the invention unduly.

EXAMPLE

The following data were obtained when treating a virgin gas oil of the properties described in Table I. In each of three runs, a temperature of 980° F. and a pressure of 85 pounds per square inch gauge were maintained for a period of three hours. Steam was used as a diluent at the rate of 60 pounds per barrel of oil charge. The product distribution for the three 3-hour runs is shown in Table II.

TABLE I

*Properties of virgin gas oil*

| | |
|---|---|
| Gravity, A. P. I. | 36.7 |
| ASTM distillation: | |
| Initial temperature, °F. | 263 |
| End point, °F. | 751 |
| Color, N. P. A. | 2 |
| Carbon residue | Nil |
| Sulfur content | 2–2½% |

In run 1, the oil was contacted with a calcined natural bauxite catalyst at a space velocity of 1.0 liquid volume of charge per volume of catalyst per hour.

For run 2, the oil was contacted with a synthetic spheroidal silica-alumina bead catalyst at a space velocity of 1.5 liquid volumes of charge per volume of catalyst per hour. The complete regeneration of this catalyst required about twice the time required for regeneration of the catalyst used in run 1, and required 3 times as much regeneration gas in the form of air.

In run 3, the oil was charged at a space velocity of 1.5 liquid volumes of charge per volume of catalyst per hour, first contacting a portion of the same calcined natural bauxite used in Run 1 in the upper half of the catalyst chamber, and then a portion of the same synthetic spheroidal silica-alumina catalyst used in run 2, in the lower half of the chamber.

TABLE II

| Run Number | 1 | 2 | 3 |
|---|---|---|---|
| Catalyst | (1) | (2) | (3) |
| Activity Index | 100 | 114 | 114 |
| Conversion, Volume percent | 50 | 50 | 50 |
| Dry Gas, Weight percent | 11.8 | 11.4 | 11.5 |
| C4, Volume percent | 6.2 | 10.9 | 10.2 |
| Debutanized 400° F. E. P. Gasoline: | | | |
| Volume percent | 34.5 | 30.7 | 31.1 |
| ASTM Octane rating, unleaded | 75.3 | 79.3 | 79.0 |
| Carbon, Weight percent | 2.8 | 3.2 | 3.0 |
| Regeneration: | | | |
| Carbon, Gms | 11.6 | 11.8 | 11.6 |
| Time Required, hours | 4 | 8 | 4 |
| Air, Cubic feet | 6.4 | 17.6 | 6.5 |

¹ Bauxite.
² Silica-Alumina.
³ Bauxite-Silicate-Alumina.

The activity index indicated in run 3 of Table II represents the activity of the composite catalyst, i. e., for the natural and synthetic catalysts combined. As may be seen by the above data, a catalyst charge of one-half natural bauxite and one-half synthetic spheroidal silica-alumina catalyst gives a conversion performance comparable to a charge of synthetic catalyst alone.

Although this process has been described and exemplified in terms of its preferred modifications, it is understood that various minor changes may be made without departing from the spirit and scope of the disclosure and of the claims.

I claim:

1. An improved process of catalytic conversion of hydrocarbons, which comprises introducing a hydrocarbon material into a catalyst chamber containing in a first zone an easily reactivated catalyst of low activity and in a second zone a difficultly reactivated catalyst of high activity, contacting said hydrocarbon material first with said low activity catalyst and second with said high activity catalyst; reactivating said catalysts at the end of a process period by passing an oxygen-containing reactivation gas through same, said reactivation gas passing through said catalyst contacting first said difficultly reactivated catalyst and second said easily reactivated catalyst, and in the opposite direction to the flow of said hydrocarbon materials.

2. An improved process for catalytic conversion of hydrocarbons, which comprises introducing a hydrocarbon material at a temperature in the range of 850 to 1100° F. into a catalyst chamber containing in a first zone a natural catalyst and in a second zone a synthetic catalyst, contacting said hydrocarbon material first with said natural catalyst and second with said synthetic catalyst, separating effluent from said catalyst chamber and recovering said separated effluents as products of the process; reactivating said natural catalyst and said synthetic catalyst at the end of a process period, passing oxygen-containing reactivation gas heated to a temperature in the range of 800 to 1000° F. through said catalyst chamber in an opposite direction to the flow of said hydrocarbon materials and contacting first said synthetic catalyst and second said natural catalyst.

3. An improved process for catalytic conversion of hydrocarbons, which comprises introducing a hydrocarbon material at a temperature in the range of 850 to 1100° F. and a pressure in the range of 10 to 200 pounds per square inch into a catalyst chamber containing a natural catalyst in a first zone and a synthetic catalyst in a second zone, said second zone comprising 25 to 50 volume per cent of said catalyst chamber, recovering conversion materials as products of the process; reactivating said natural catalyst and said synthetic catalyst at the end of a process period, passing an oxygen-containing reactivation gas, at a temperature of 800 to 1000° F. and a gaseous space velocity of 500 to 2000 volumes of gas per volume of catalyst per hour, through said catalyst chamber in an opposite direction to the flow of said hydrocarbon materials, said reactivation gas containing 4 to 8 volume per cent oxygen until the outer deposit of carbonaceous material is removed from the catalysts as indicated by the temperature within the catalyst zones, reducing the per cent of said oxygen, after said outer deposit of carbonaceous material has been removed, to 3 to 3½ per cent, and passing said oxygen-containing reactivation gas through said catalysts until they have been reactivated.

4. An improved fixed-bed process for catalytic conversion of hydrocarbons, which comprises introducing a hydrocarbon material selected from the group consisting of gas oil, topped crude, and reduced crude, at a temperature of 850 to 1100° F., a pressure of 10 to 200 pounds per square inch, and a liquid space velocity of 0.5 to 10 volumes of hydrocarbon per volume of catalyst per hour, into a catalyst chamber, said catalyst chamber containing a natural catalyst in a first zone and a synthetic catalyst in a second zone, said second zone comprising 25 to 50 volume per cent of said catalyst chamber, cracking said hydrocarbon material in said first catalyst zone, passing cracked products and uncracked hydrocarbon material into said second catalyst zone, reforming said cracked products from said first catalyst zone and cracking said uncracked materials, recovering conversion materials as products of the process; reactivating said natural catalyst and said synthetic catalyst at the end of a process period to remove carbonaceous deposits from said catalysts, passing an oxygen-containing reactivation gas at a temperature of 800 to 1000° F. and a gaseous space velocity of 500 to 2000 volumes of gas per volume of catalyst per hour through said catalyst chamber in a direction opposite to that of the flow of said hydrocarbon materials, said reactivation gas containing 4 to 8 per cent oxygen, until said carbonaceous deposit is removed from the outside of said catalysts, reducing the per cent of said oxygen, after said outer deposit of carbonaceous material has been removed, to 3 to 3½ per cent, and passing said oxygen-containing reactivation gas through said catalysts until they have been regenerated.

5. A process according to claim 4 wherein the natural catalyst in said first catalyst zone is natural bauxite, and the synthetic catalyst in said second catalyst zone is synthetic spheroidal silica-alumina.

6. A process according to claim 4 wherein the temperatures within the catalyst zones during reactivation are maintained at not more than 1400° F. in the natural catalyst zone and not more than 1100° F. in the synthetic catalyst zone.

7. A process according to claim 2 wherein the oxygen content of said regeneration gas is controlled in such a manner that at least 2 to 2.5 volume per cent remains therein after contact with said synthetic catalyst and before contact with said natural catalyst.

KING LOUIS MILLS, JR.

REFERENCES CITED

The following references are of record in the file of this patent:

UNITED STATES PATENTS

| Number | Name | Date |
| --- | --- | --- |
| 2,254,555 | Thomas | Sept. 2, 1941 |
| 2,310,962 | Lassiat | Feb. 16, 1943 |
| 2,331,427 | Schulze et al. | Oct. 12, 1943 |
| 2,383,218 | Schulze | Aug. 21, 1945 |
| 2,398,819 | Cook | Apr. 23, 1946 |